Aug. 20, 1929.    A. J. MAERTINS    1,724,948
WINDSHIELD CLEANER
Filed Jan. 24, 1928

INVENTOR
Albert J. Maertins
by his attorney
Robert L. Geist

Patented Aug. 20, 1929.

1,724,948

UNITED STATES PATENT OFFICE.

ALBERT J. MAERTINS, OF WOLLASTON, MASSACHUSETTS.

WINDSHIELD CLEANER.

Application filed January 24, 1928. Serial No. 249,050.

This invention relates to windshield cleaners, and is herein shown as embodied in a cleaner of the type employed for removing accumulations of frost, snow or ice, as well as dust and moisture, from windshields of automobiles.

Windshield cleaners, of the type referred to and now on the market, are commonly provided with a wiper blade for removing dust or moisture from a portion of a windshield together with an electric heating coil for melting snow or ice which may be deposited in the path of the cleaner.

Considerable difficulty has heretofore been experienced in devising a cleaner sufficiently rugged in construction to withstand the rough usage to which it is subjected, particularly during the winter months, and at the same time one which is provided with a heater effective for the purpose indicated, without multiplying the number of parts in such a way as to increase the cost of manufacture. This difficulty is occasioned by the fact that windshield cleaners should be comparatively small in order to present a minimum of obstruction to the view through the windshield; they should be light in weight so that they can be operated without great expenditure of effort or power; and the heater which is usually operated from a storage battery must be adapted to supply heat enough to melt ice substantially in the open air during cold weather, without utilizing an excessive amount of electric current.

In view of the foregoing, it is an object of the present invention to provide an improved windshield cleaner which, without sacrificing any of the characteristic advantages of cleaners now in use, is simple in construction, is effective in operation, and is adapted to rapid assembly.

To this end, and in accordance with one feature of the invention, there is provided a windshield cleaner comprising a heater and a plurality of wiper blades removably secured to the heater and arranged to form therewith a heating chamber which during the operation of the cleaner is movable over a windshield and is operative to melt snow or ice deposited upon the windshield. Preferably, and as illustrated, the heater which forms the body of the cleaner consists in a unitary structure to which the wiper blades are attached, thereby eliminating the necessity of a separate casing or body member. Furthermore, the wiper blades can be removed and replaced when they are worn out without disassembly of the heater.

Another feature of the invention relates to the provision of an improved heater unit for windshield cleaners having a heating coil located within a casing and insulated therefrom, the casing being provided with an open bottom and having offset portions for retaining the coil and insulating material within the casing. As shown, the casing comprises a strip of light metal, preferably aluminum, bent transversely in the shape of a U, slits being made along the edges of the casing to form tabs which when bent inwardly secure within the casing a heating coil and a tube of insulating material, such as asbestos, containing the coil. This construction effects economy in manufacture since heater units can be made up in six or eight foot lengths and can then be cut to the size required for individual units, thus reducing assembly costs.

Other objects and features of the invention will be apparent from the detailed description when taken in connection with the accompanying drawings, in which:—

Figures 1, 2, 3:
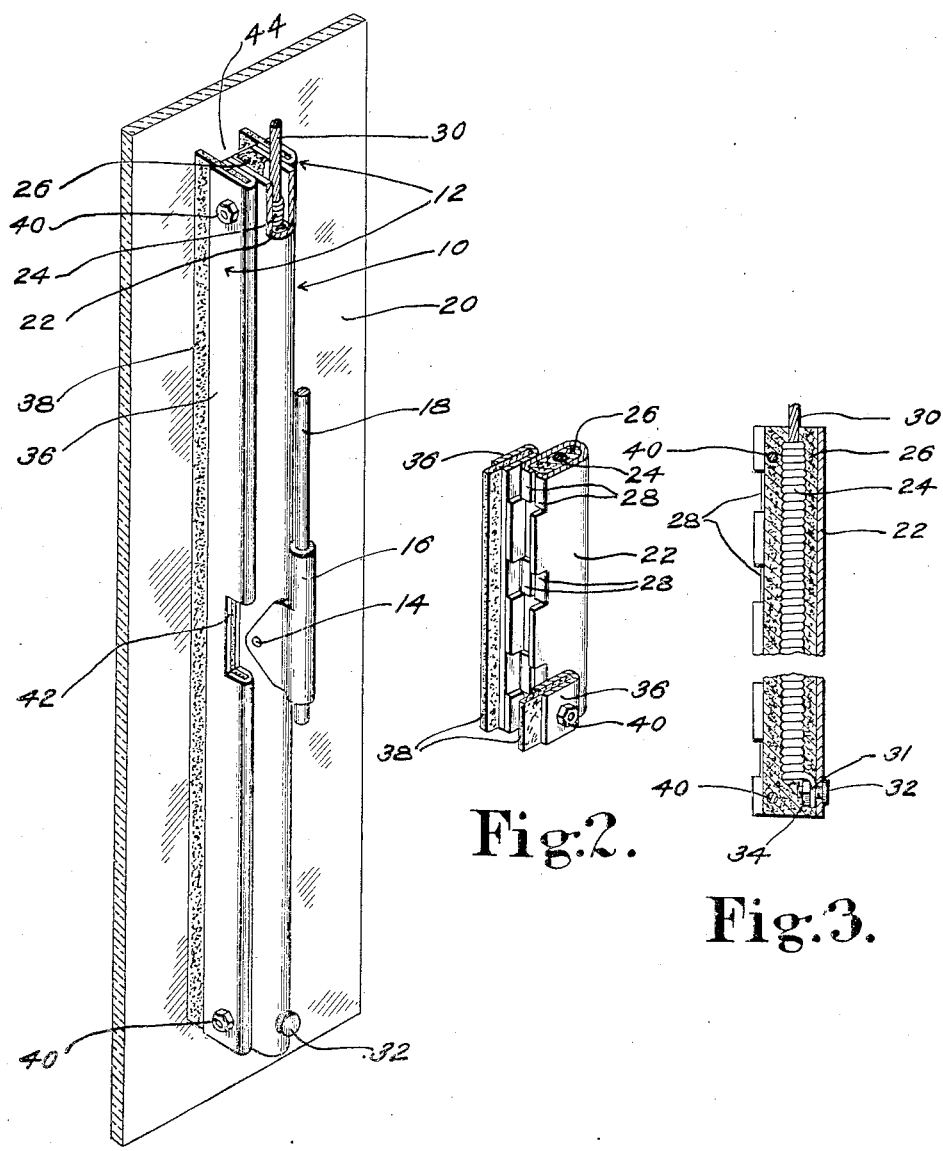
Fig. 1 is a perspective view of a windshield cleaner according to the invention, shown in operative position with relation to a section of a windshield.
Fig. 2 is a perspective view, partly in section, of a portion of the cleaner with part of one wiper blade removed.
Fig. 3 illustrates a transverse cross-section longitudinally through the cleaner.

As shown in the drawings, the windshield cleaner comprises a body member 10 and a plurality of wiper members 12 secured thereto. Pivotally mounted upon a pin 14 located near the central portion of the body member is a sleeve 16 to which is secured an arm 18 by which movements are imparted to the cleaner in sweeping it over a windshield or other surface, such as that shown at 20.

The body member 10 constitutes a heating unit which comprises a casing 22, best shown in Fig. 2, within which is positioned an electric heating coil 24 surrounded by insulating material 26, such as asbestos, which substantially fills that portion of the casing not occupied by the heating coil. The casing 22 is formed from a strip of light metal, preferably aluminum, bent transversely into the shape of a U. The casing is bent around the insulating material, which conveniently may be in the form of a tube containing the coil 24, so as to press tightly upon three sides of the material. The side margins of the casing are provided with a number of short slits, the portions of the casing between adjacent slits of alternate pairs of slits lengthwise of the casing being bent inwardly to form projections 28 integral with the casing and engaging the fourth side of the insulating material to hold it and the heating coil securely in position within the casing.

One end of the coil 24 is connected to a wire 30 which leads to a battery, not shown. The other end 31 of the coil is grounded to the casing 22 by means of the screw 32 and the nut 34 between which it is held. In operation, the coil 24 is heated by an electric current which passes along the wire 30, through the coil to the casing 22 and back to the battery by way of the cleaner arm 18.

Secured to the sides of the casing 22 are the two wiper members 12 above referred to. Each of these members comprises a U-shaped holder 36 containing a wiper blade or strip 38, preferably made of rubber, and extending beyond the side margins of the casing 22 when the wiper members are in position. The wipers are removably secured to the casing by means of bolts 40, thus to permit replacement of the wipers without disassembly of the heating unit. Each of the wipers is cut away at its central portion, as at 42, to permit free movement of the sleeve 16 in accommodating the cleaner to the surface being operated upon.

In operation, the cleaner is moved bodily, either by hand or by automatic mechanism, over the surface to be operated upon. The wiper blades 38, which are held in contact with the surface, clear it of accumulations of dust or water in a manner common to windshield cleaners now in use. When ice is present upon the surface, electric current is passed through the coil 24 producing a high heat which acts upon the ice to melt it, the wiper blades subsequently removing the resulting liquid. The lower portions of the body member 10 and the wiper members 12 form, with the surface being operated upon, a heating chamber (44) which effectively concentrates heat upon the surface in melting the ice.

While the invention has been illustrated as embodied in a cleaner for windshields, it is to be understood that it is not intended to be so limited, but is adapted to other uses.

Having described my invention, what I claim as new and desire to secure by Letters Patent of the United States is:—

1. A windshield cleaner comprising a heating coil, insulating material surrounding the coil, a casing comprising a U-shaped strip of metal bent transversely around the coil and insulating material so as to engage three sides thereof, and projections formed integrally with the strip and along the entire length thereof for engaging the material on the fourth side thereof permanently to retain the coil and insulating material within the casing.

2. A windshield cleaner comprising a casing formed of a strip of metal having a U-shaped cross-section, a plurality of wiper members extending longitudinally of the casing and removably secured thereto, a heating coil positioned within the casing, insulating material located within the casing and surrounding the coil, and inwardly extending projections formed integrally with the casing for permanently securing the coil and insulating material within the casing.

In testimony whereof I have signed my name to this specification.

ALBERT J. MAERTINS.